United States Patent [19]

Yamazaki et al.

[11] Patent Number: 4,941,118

[45] Date of Patent: Jul. 10, 1990

[54] DIVISION CIRCUIT HAVING AN OPERATION LOOP INCLUDING AN ADDER AND MULTIPLIER

[75] Inventors: Mituo Yamazaki; Kazuo Konisi, both of Kanagawa, Japan

[73] Assignee: Kabushiki Kaisha Toshiba, Kawasaki, Japan

[21] Appl. No.: 248,974

[22] Filed: Sep. 26, 1988

[30] Foreign Application Priority Data

Sep. 26, 1987 [JP] Japan .................. 62-241351

[51] Int. Cl.$^5$ ................................................ G06F 7/50
[52] U.S. Cl. .................................................... 364/761
[58] Field of Search ............... 364/761, 762, 763, 764, 364/850

[56] References Cited

U.S. PATENT DOCUMENTS

| | | | |
|---|---|---|---|
| 3,652,930 | 3/1972 | Sugiyama et al. | 364/850 |
| 4,388,694 | 6/1983 | Loveland | 364/850 |
| 4,682,302 | 7/1987 | Williams | 364/761 |
| 4,800,515 | 1/1989 | Hori et al. | 364/761 |

Primary Examiner—David H. Malzahn
Attorney, Agent, or Firm—Oblon, Spivak, McClelland, Maier & Neustadt

[57] ABSTRACT

A division circuit for calculating a division between a dividend and a divisor. The division circuit includes a first input circuit for receiving the dividend, a second input circuit for receiving the divisor, an adder coupled at its first input terminal to the first input circuit for receiving the dividend and having a second input terminal, a multiplier coupled at its first input terminal to the output terminal of the adder and at it output terminal to the second input terminal of the adder so that the adder and the multiplier constitute an operation loop, the second input terminal of the multiplier being coupled to the second input circuit for receiving the divisor and a registor coupled to the operation loop for outputting a quotient obtained in the operation loop.

6 Claims, 5 Drawing Sheets

PRIOR ART

| n | 1 | 2 | 3 | 4 | 5 | 6 | 7 | 8 | 9 | 10 | 11 | 12 | — |
|---|---|---|---|---|---|---|---|---|---|----|----|----|---|
| y | 1 | 1.5 | 1.75 | 1.875 | 1.9375 | 1.9687 | 1.9844 | 1.9922 | 1.9961 | 1.9980 | 1.9990 | 1.9995 | — |

FIG. 7B x = 1, A = 0.1

| n | 1 | 2 | 3 | 4 | 5 | 6 | 7 | 8 | 9 | 10 | 11 | 12 | — |
|---|---|---|---|---|---|---|---|---|---|----|----|----|---|
| y | 1 | 1.9 | 2.71 | 3.44 | 4.10 | 4.69 | 5.22 | 5.70 | 6.13 | 6.52 | 6.86 | 7.18 | — |

DIVISION CIRCUIT HAVING AN OPERATION LOOP INCLUDING AN ADDER AND MULTIPLIER

FIELD OF THE INVENTION

The present invention relates, generally to a division circuit, and more particularly, to a division circuit for processing digital information data.

BACKGROUND OF THE INVENTION

In a typical system for digital signal processing, a division circuit has been used for carrying out digital data processing, such as a signal standization, signal operation. Therefore, some division circuits or systems have been proposed. For example, Japanese document: "Digital Technology Series No. 3, pp. 30 to 34; Digital Signal Processing System" published by Tokai University Publishing Society on Oct. 25, 1986, discloses a divider according to an improved non-restoring division method for a use of digital signal processing system. The divider, however, requires a large-scale and complicated hardwares for carrying out the division.

Figure 1:
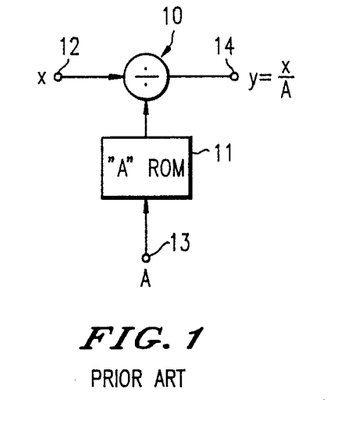
FIG. 1 is a block diagram showing a first example of conventional division circuits.
Figure 2:
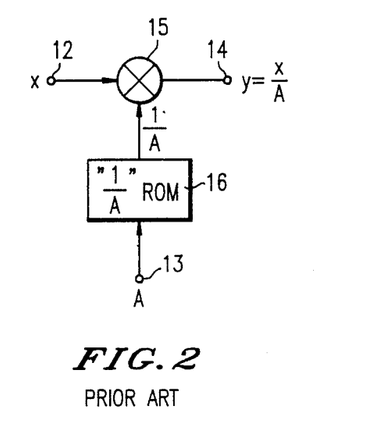
FIG. 2 is a block diagram showing a second example of the conventional division circuits.
Figure 3:
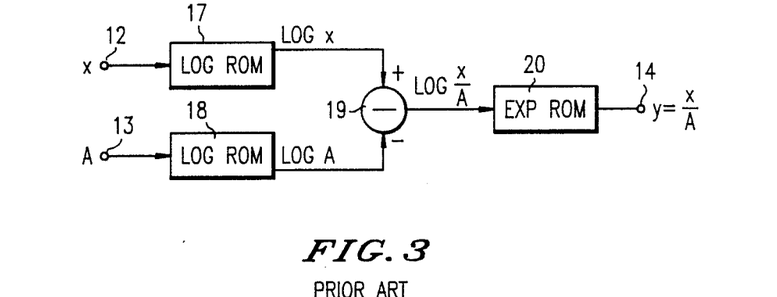
FIG. 3 is a block diagram showing a third example of the conventional division circuits.

Referring now to FIGS. 1 to 3, some conventional division circuits will be briefly described. FIG. 1 shows a first example of the division circuit. In FIG. 1, the division circuit comprises a divider 10 and a divisor ROM (Read Only Memory) 11. A dividend x is applied to the divider 10 through a dividend input terminal 12. A divisor A is applied to the divisor ROM 11 through a divisor input terminal 13. The divisor ROM 11 stores practical data for divisors A therein. Thus, the divisor ROM 11 applies a suitable data of the divisor A to the divider 10. Then, the divider 10 outputs a quotient y (y=x/A) The quotient y is obtained through a quotient output terminal 14. The divisor ROM 11 can make the processing of the division in the divider 10 easy.

Generally, the divisor ROM 11 is designed for the exclusive use of the division circuit. Practical data of the divisors A are stored in the divisor ROM 11. Therefore, the division circuit as shown in FIG. 1 has a simple construction. Practical designs for the division can accomplished by simply writing data in the divisor ROM 11. The design of the division also can be made in a relatively short time of period. Therefore, the division circuits as shown in FIG. 1 are used in the discrete type apparatus.

The division circuit as shown in FIG. 1, however, requires a relatively large-scale memory capacity for the divisor ROM 11. For example, it is assumed that both the dividend x and the divisor A are 8 bit data. Then the divisor ROM 11 must have a memory capacity of $2^{(8+8)}$ bits or 524 K.bits.

FIG. 2 shows a second example of the conventional division circuit. In FIG. 2, the division circuit comprises a multiplier 15 and a multiplier ROM 16. A dividend x for the division circuit is applied to the multiplier 12 through a dividend input terminal 12 as a multiplicand x. A divisor A for the division circuit is applied to the multiplier ROM 13 through an divisor input terminal 13. The multiplier ROM 16 stores practical data of reciprocals 1/A corresponding to the divisors A. Thus, the multiplier ROM 16 applies a suitable data of the reciprocals 1/A to the multiplier 15 as a multiplier 1/A. Then, the multiplier 15 outputs a product y (y=x·(1/A)). The product y is output through a quotient output terminal 14 of the division circuit as a quotient y (y=x/A) between the dividend x and the divisor A.

The division circuit as shown in FIG. 2 requires a memory capacity for the multiplier ROM 16 less than the divisor ROM 11, as shown in FIG. 1. It is assumed that both the dividend x and the divisor A are 8 bit data, in similar to the case of FIG. 1. Then the multiplier ROM 16 must have a memory capacity of $2^8 \times 8$ bits or 2 K.bits.

FIG. 3 shows a third example of the conventional division circuit. In FIG. 3, the division circuit comprises a pair of logarithm ROMs 17 and 18, a subtractor 19 and an exponential ROM 20. A dividend x is applied to the first logarithm ROM 17 through a dividend input terminal 12. A divisor A is applied to the second logarithm ROM 18 through a divisor input terminal 13. The logarithm ROMs 17 and 18 store practical data of logarithms, Log x and Log A corresponding to the dividend x and the divisor A, respectively. Thus, the logarithm ROMs 17 and 18 apply suitable da&a of the logarithms, Log x and Log A to the subtractor 19.

The subtractor 19 carries out the subtraction of the Log A from the Log x. Thus, the subtractor 19 outputs a difference Y (Y=Log x−Log A=Log (x/A)). The difference Y (=Log (x/A)) is applied to the exponential ROM 20.

The exponential ROM 20 stores some practical data of exponential of the difference Y, i.e., Exp Y. Thus, the exponential ROM 20 outputs the exponential, Exp Y. That is, the exponential ROM 20 carries out an exponential calculation which is the reverse operation of the logarithm operation in the logarithm ROMs 17 and 18. The operation output y of the exponential ROM 20. i.e.. the exponential, Exp Y is output from a quotient output terminal 14 of the division circuit.

The exponential operation carried out in the exponential ROM 20 is the reverse operation of the logarithm operations carried out in the logarithm ROMs 17 and 18, as described above. Thus, the output y of the exponential ROM 20 becomes the quotient (x/A) between the dividend x and the divisor A.

In the division circuit as shown in FIG. 3, each of the logarithm ROMs 17 and 18 and the exponential ROM 20 requires a memory capacity of $2^8 \times 8$ bits or 2 K.bits. The division circuit of FIG. 3 thus requires $2^8 \times 8 \times 3$ bits or 6 K.bits, in total.

As described above, the conventional division circuits is constituted by using ROMs. The ROMs, however, require a large scale of memory capacity for storing data necessary to carry out the division. Thus, the conventional division circuits has a drawback in the circuit size.

SUMMARY OF THE INVENTION

It is, therefore, an object of the present invention to provide a division circuit which is realized by a relatively small circuit size.

Another object of the present invention to provide a division circuit which is realized by using a relatively small capacity of storing means.

Further object of the present invention to provide a division circuit which is realized without using ROM means.

In order to achieve the above object, a division circuit according to one aspect of the present invention for calculating a division between a dividend and a divisor includes a first input circuit for receiving the dividend, a second input circuit for receiving the divisor, an adder coupled at its first input terminal to the first input circuit for receiving the dividend and having a second input terminal, a multiplier coupled at its first input terminal to the output terminal of the adder and at it output terminal to the second input terminal of the adder so that the adder and the multiplier constitute an operation loop, the second input terminal of the multiplier being coupled to the second input circuit for receiving the divisor and a registor coupled to the operation loop for outputting a quotient obtained in the operation loop.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 4 through 8. Throughout the drawings, reference numerals or letters used in FIGS. 1 through 3 (Prior Arts) will be used to designate like or equivalent elements for simplicity of explanation.

The present invention provides a new division circuit which is preferable to constitute by a digital signal processing technique. Thus, prior to the description of the division circuit according to the present invention, a typical construction of a digital signal processor (referred as DSP, hereafter) will be described in brief.

Recently, a DSP has been developed in the field of signal processing, such as the division for signals.

Figure 4:
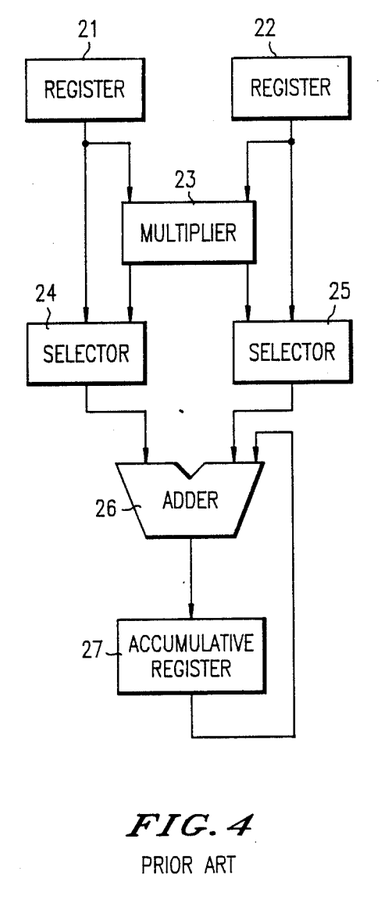
FIG. 4 is a block diagram showing a typical digital signal processor.

FIG. 4 shows a typical example of the DSP. The DSP of FIG. 4 comprises a pair of registors 21 and 22, a multiplier 23, a pair of selectors 24 and 25, an adder 26 and an accumulative resistor 27. In the DSP type division circuit, data stored in the registors 21 and 22 are applied to the multiplier 23 and the selectors 24 and 25. The same products output from the multiplier 23 are applied to the selectors 24 and 25. The selectors 24 and 25 select predetermined data from the registors 21 and 22 and the multiplier 23. Selected data from the selectors 24 and 25 are applied to the adder 26. A sum output from the adder 26 is applied to the accumulative registor 27. The sum data stored in the accumulative registor 27 is fed back to the adder 26. Thus, the adder 26 and the accumulative registor 27 constitute an operation loop for repeatedly carrying out a predetermined operation for the data in the loop. The operated data circulates in the operation loop.

According to the DSP, a necessary calculation result is obtained by cyclic operations in the loop. Thus, the DSP can be constituted by a relatively small circuit size.

Figure 5:
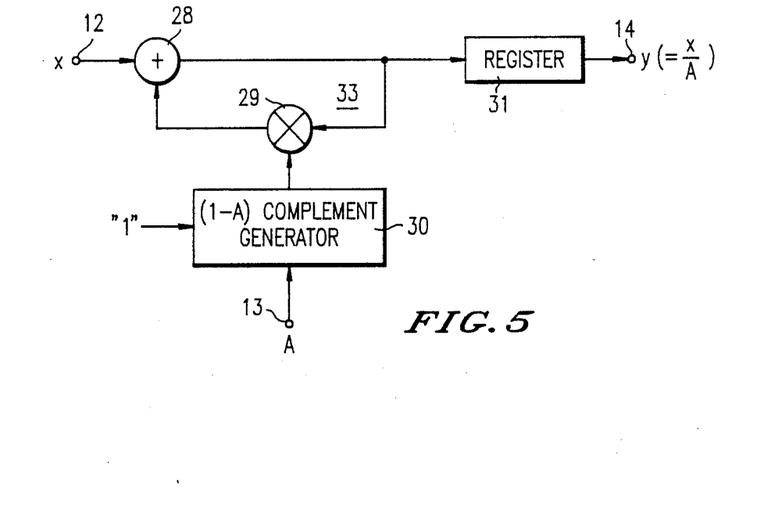
FIG. 5 is a block diagram showing a first embodiment of the division circuit according to the present invention.
Figure 6:
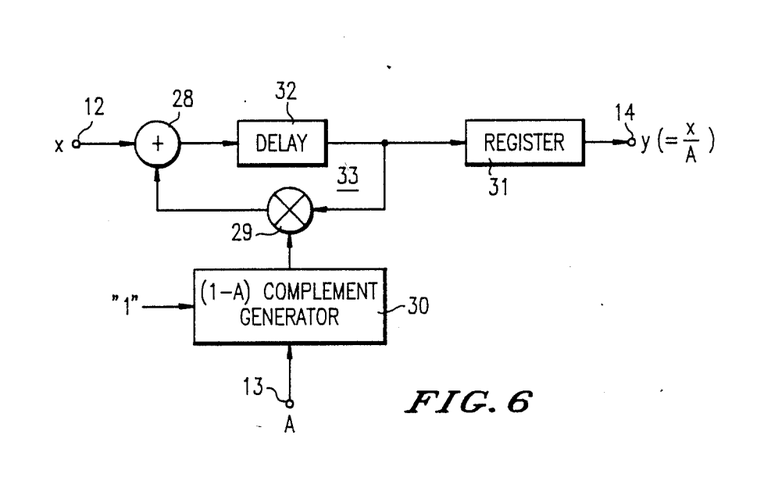
FIG. 6 is a block diagram showing a practical modification from the first embodiment of FIG. 5.

Referring now to FIGS. 5 and 6, a first embodiment of the division circuit according to the present invention will be described in detail. FIG. 5 shows a principle construction of the division circuit. As shown in FIG. 5, the division circuit comprises an adder 28, a multiplier 29, a complement generator 30 and a register 31.

A dividend x is applied to the adder 28 through a dividend input terminal 12. The adder 28 carries out the addition for the dividend x and another input as described later. Thus, the adder 28 outputs a sum y. The sum y is applied to one input of the multiplier 29. Another input of the multiplier 29 is coupled to the complement generator 30.

A divisor A is applied to the complement generator 30 through a divisor input terminal 13. The complement generator 30 generates a complement $(1-A)$ of the divisor A for the particular value "1" by subtracting the divisor A from "1". So that, the complement $(1-A)$ is output from the complement generator 30. The complement $(1-A)$ is applied to the multiplier 29. Thus, the multiplier 29 outputs a product of the sum y output from the adder 28 and the complement $(1-A)$ output from the complement generator 30, i.e., the product $y \cdot (1-A)$. The product $y \cdot (1-A)$ output from the multiplier 29 is applied to the other input of the adder 28. Thus, the sum y is represented as follows;

$$y = x + y \cdot (1-A) \text{ or}$$

$$y = x/A \qquad \ldots (1)$$

The sum y output of the adder 28 is stored in the registor 31. Then the sum data y is obtained from the registor 31 as the division result, i.e., the quotient y calculated by the division circuit.

FIG. 6 shows a practical construction of the first embodiment of the division circuit. The division circuit is realized in a DSP type division circuit which corresponds to the division circuit of FIG. 5. In FIG. 6, the division circuit further comprises a delay 32 coupled to the output of the adder 28. Thus, the sum y output from the adder 28 is applied to the multiplier 29 and the registor 31, after delayed for a predetermined period by the delay 32. As a result, the adder 28, the delay 32 and the multiplier 29 constitute an operation loop 33 for circulating the sum y obtained by the adder 28 therein.

A general formular $y_{(n)}$ of the quotient y obtained by the division circuit of FIG. 2 is represented as follows;

$$y_{(n)} = x + y_{(n-1)} \cdot (1-A) \qquad \ldots (2)$$

wherein n means the number of circulations of data in the operation loop 33. The number of circulations n is determined in accordance with the bit number of the data to be prepared in the division circuit.

Now, some cases of the operation of the division circuit of FIG. 6 will be described. As a first case, the dividend x and the divisor A are set to the values in which they are relatively close to each other. For example, the dividend x and the divisor A are set to the values "1" and "0.5", respectively. An initial value $y_{(0)}$ of the quotient y is preset to the value "0". Further, the quotient y is assumed to be obtained by a value of 4 bit data.

Then, a first quotient $y_{(1)}$ obtained by the operation of one circulation of data in the operation loop 33 is represented as follows;

$$y_{(1)} = x + y_{(1-1)} \cdot (1-A) = x + y_{(0)} \cdot (1-A)$$
$$= 1 + 0 \cdot (1-0.5) = 1$$

The first quotient $y_{(1)}$ thus obtained is further applied to the operation loop 33. Thus, the quotient y stored into the registor 31 varies in accompany with the progress of the cyclic operations in the operation loop 33. For example, other quotients from second to fifth, i.e., $y_{(2)}$ to $y_{(5)}$ are obtained as follows;

$$y_{(2)} = x + y_{(2-1)} \cdot (1-A) = x + y_{(1)} \cdot (1-A)$$
$$= 1 + 1 \cdot (1-0.5) = 1.5$$

$$y_{(3)} = x + y_{(3-1)} \cdot (1-A) = x + y_{(2)} \cdot (1-A)$$
$$= 1 + 1.5 \cdot (1-0.5) = 1.75$$

$$y_{(4)} = x + y_{(4-1)} \cdot (1-A) = x + y_{(3)} \cdot (1-A)$$
$$= 1 + 1.75 \cdot (1-0.5) = 1.875$$

$$y_{(5)} = x + y_{(5-1)} \cdot (1-A) = x + y_{(4)} \cdot (1-A)$$
$$= 1 + 1.875 \cdot (1-0.5) = 1.9375$$

The general formular $Y_{(n)}$ of the quotient y in Equation (2) can also be expressed as follows;

$$y_{(n)} = x/A - 1/2^{n-1} \qquad \ldots (3)$$

The power (n−1) in Equation (3) corresponds to the bit number. As be understood from Equation (3), the value of the quotient $y_{(n)}$ collects for the true value of the division x/A. If the dividend x and the divisor A are 8 bit data, the quotient y in the above example collects to the true value "2" at a difference of $\frac{1}{2}^8$ (=0.0039062).

Figure 7A:
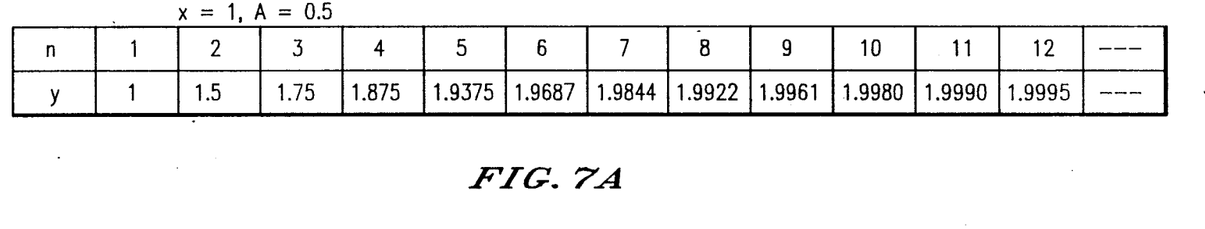
FIGS. 7(a) and 7(b) are tables showing quotients obtained by cyclic division operations for prescribed two cases of the divisor.

In the first case, the quotients $y_{(n)}$ obtained by the operations in the operation loop 33 from first to twelfth circulation are shown by the Table in FIG. 7(a). As seen from the Table in FIG. 7(a), the twelfth quotient $y_{(12)}$ (=1.9995) is sufficiently close to the true value "2" of the division x/A.

As a second case, the dividend x and the divisor A are set to the values in which they are relatively far from each other. For example, the dividend x and the divisor A are set to the values "1" and "0.1", respectively. An initial value $y_{(0)}$ of the quotient y is also preset to the value "0" and the quotient y is also assumed to be obtained by a value of 4 bit data.

Figure 7B:
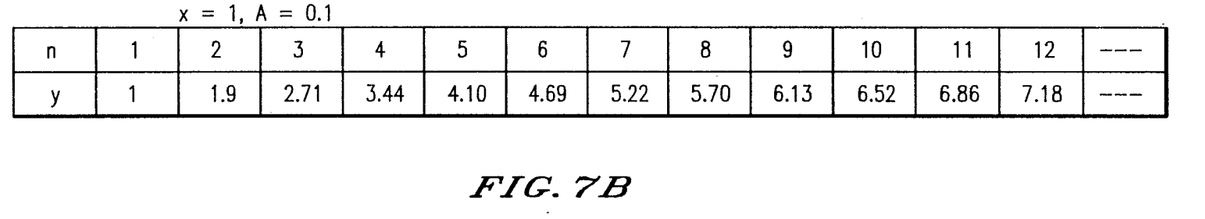

In the second case, the quotients $y_{(n)}$ obtained by the operations in the operation loop 33 from first to twelfth circulation are shown in the Table in FIG. 7(b). As seen from the Table (b), the value "7.18" of the twelfth quotient $y_{(12)}$ is still far from the true value "10" of the x/A at that time. Therefore, a very large number of circulations are required to obtain the quotient y having a value sufficiently close to the true value of the division x/A.

Figure 8:
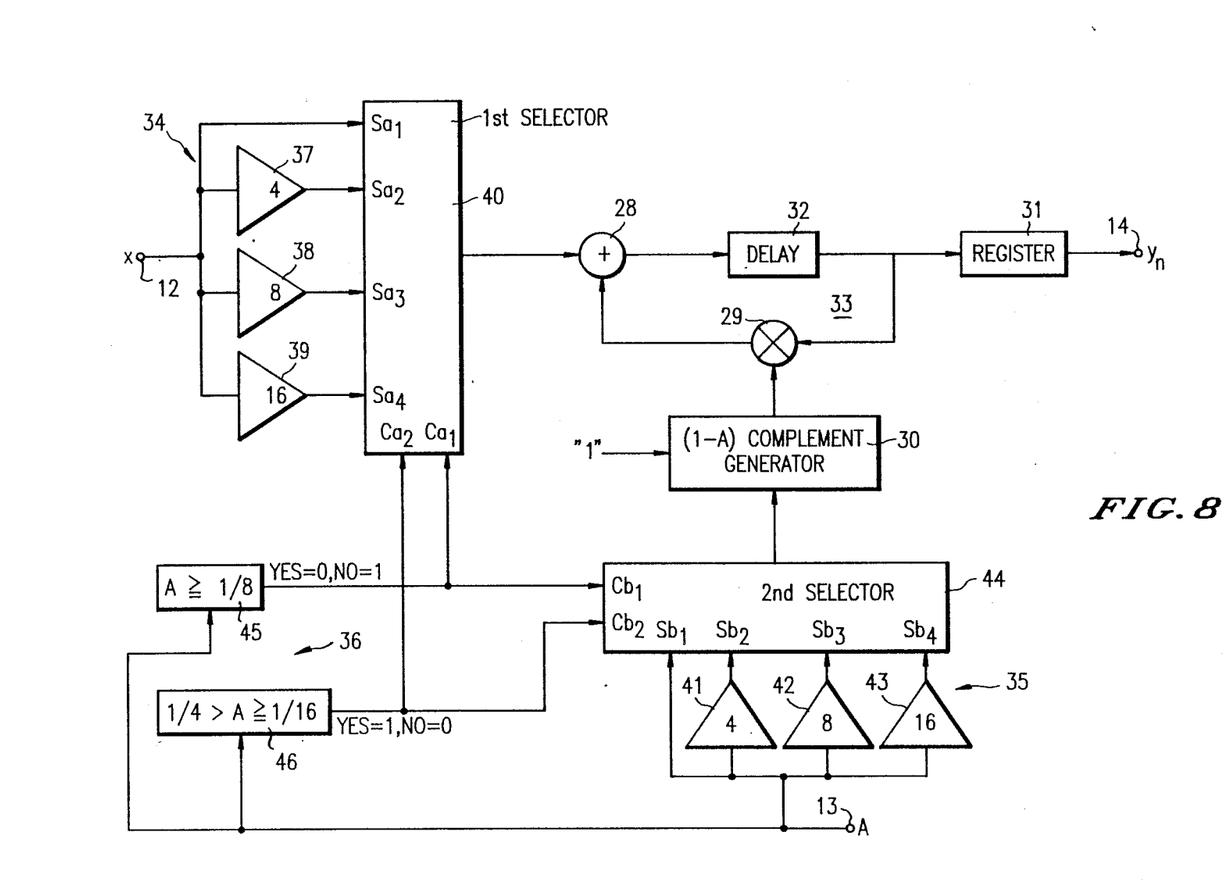
FIG. 8 is a block diagram showing a second embodiment of the division circuit according to the present invention.

Referring now to FIG. 8, a second embodiment of the division circuit according to the present invention will be described in detail. The second embodiment of FIG. 8 is an improvement of the first embodiment shown in FIGS. 5 and 6. As shown in FIG. 8, the second embodiment of the division circuit further comprises a dividend adjusting circuit 34, a divisor adjusting circuit 35 and a divisor value range discrimination circuit 36. The dividend adjusting circuit 34 is coupled between the dividend input terminal 12 and the adder 28. The divisor adjusting circuit 35 is coupled between the divisor input terminal 13 and the complement generator 30. The divisor value range discrimination circuit 36 is coupled to the divisor input terminal 13 for receiving the divisor A. Further the divisor value range discrimination circuit 36 is coupled to both the dividend adjusting circuit 34 and the divisor adjusting circuit 35 for applying discrimination outputs therefor.

The dividend adjusting circuit 34 comprises an 4-times gain amplifier 37, an 8-times gain amplifier 38, an 16-times gain amplifier 39 and a first selector 40. The 4-times gain amplifier 37, the 8-times gain amplifier 38 and the 16-times gain amplifier 39 are coupled in parallel with each other between the dividend input terminal 12 and the second, third and fourth selector terminals Sa2, Sa3 and Sa4 of the first selector 40. The first selector terminal Sa1 of the first selector 40 is directly coupled to the dividend input terminal 12. The output terminal of the first selector 40 is coupled to the adder 28.

The divisor adjusting circuit 35 comprises a 4-times gain amplifier 41, an 8-times gain amplifier 42, a 16 gain amplifier 43 and a second selector 44. The 4-times gain amplifier 41, the 8-times gain amplifier 42 and the 16 gain amplifier 43 are coupled in parallel with each other between the divisor input terminal 13 and the second, third and fourth selector terminals Sb2, Sb3 and Sb4 of the second selector 44. The first selector terminal Sb1 of the second selector 44 is directly coupled to the divisor input terminal 13. The output terminal of the second selector 44 is coupled to the complement generator 30.

The divisor value discrimination circuit 36 comprises a first value range discriminator 45 and a second value range discriminator 46. The first value range discriminator 45 is coupled to the divisor input terminal 13 for receiving the divisor A. Further the first value range discriminator 45 is coupled to both the first control terminals Ca1 and Cb1 of the first and second selectors 40 and 44 for applying discrimination outputs therefor. The second value range discriminator 46 is coupled to the divisor input terminal 13 for receiving the divisor A. Further the second value range discriminator 46 is coupled to both the second control terminals Ca2 and Cb2 of the first and second selectors 40 and 44 for applying discrimination outputs therefor.

The first value range discriminator 45 discriminates whether if the divisor A is larger than the value "$\frac{1}{4}$" [$A \geq \frac{1}{4}$] or not. When the divisor A is larger than the value "$\frac{1}{4}$" [$A \geq \frac{1}{4}$], the first value range discriminator 45 applies a logic value "0" to the first control terminals Ca1 and Cb1 of the first and second selectors 40 and 44. When the divisor A is less than the value "$\frac{1}{4}$" [$A \leq \frac{1}{4}$], the first value range discriminator 45 applies a logic value "1" thereto.

The second value range discriminator 46 discriminates whether if the divisor A is in the range equal or larger than the value "1/16" but less than the value "$\frac{1}{4}$" [$\frac{1}{4} > A \geq 1/16$] or not. When the divisor A is in the range [$\frac{1}{4} > A \geq 1/16$], the second value range discriminator 46 applies the logic value "1" to the second control terminals Ca2 and Cb2 of the first and second selectors 40 and 44. When the divisor A is out of the range [$A \geq \frac{1}{4}$ or A<1/16], the second value range discriminator 46 applies the logic value "0" thereto.

Thus, the divisor value range discrimination circuit 36 discriminates four ranges of the divisor A, i.e., the first range [1>A≧½], the second range [½>A≧¼], the third range [¼>A≧1/16] and the fourth range [1/16>A].

Now, a dividend x applied to the dividend input terminal 12 is set to the value "1". When a divisor A in the first range [1>A≧½] is applied to the divisor input terminal 13, both the first and second divisor value range discriminators 45 and 46 output the logic value "0". As a result, the first and second selectors 40 and 44 select their first selector terminals Sa1 and Sb1. The dividend x and the divisor A are thus applied to the adder 28 and the complement generator 30 without being amplified. In this case, the division circuit operates in similar to the first case described for the first embodiment shown in FIG. 6.

When a divisor A in the second range [½>A≧¼] is applied to the divisor input terminal 13, the first and second divisor value range discriminators 45 and 46 of the divisor value range discrimination circuit 36 apply the logic values "0" and "1" to the second selector 44, respectively. As a result, the second selector 44 selects its second selector terminal Sb2. A modified divisor 4·A amplified by the 4-times gain amplifier 41 is applied to the complement generator 30. That is, the divisor A in the relatively small value range [½>A≧¼] is modified to the amplified divisor 4·A which ±s close to the value "1". The amplified divisor 4·A is applied to the complement generator 30.

The modified divisor, i.e., the amplified divisor 4·A is very close to the value "1". So that the division output Y(n) of the operation loop 33 can collect to the true value to be obtained by the division circuit, in the relatively small number of circulations in the operation loop 33.

On the other hand, the logic values "0" and "1" of the first and second divisor value range discriminators 45 and 46 of the divisor value range discrimination circuit 36 control the first selector 40 to select the second selector terminal Sa2. Thus, a modified dividend amplified by the 4-times gain amplifier 37 is applied to the adder 28. That is, the dividend x is amplified to the value 4·x for compensating similarly the modification of the divisor A. As a result, the division circuit carries out the correct division operation for the dividend x and the divisor A.

When a divisor A in the third range [¼>A≧1/16] is applied to the divisor input terminal 13, both the first and second divisor value range discriminators 45 and 46 of the divisor value range discrimination circuit 36 apply the same logic values "1" to the second selector 44, respectively. As a result, the second selector 44 selects its third selector terminal Sb3. A modified divisor 8·A amplified by the 8-times gain amplifier 42 is applied to the complement generator 30. That is, the divisor A in the small value range [¼>A≧1/16] is modified to the amplified divisor 8·A which is close to value "1". The amplified divisor 8·A is applied to the complement generator 30.

On the other hand, the logic values "1" of the first and second divisor value range discriminators 45 and 46 of the divisor value range discrimination circuit 36 control the first selector 40 to select the third selector terminal Sa3. Thus, a modified dividend amplified by the 8-times gain amplifier 38 is applied to the adder 28. That is, the dividend x is amplified to the value 8·x for compensating similarly the modification of the divisor A. As a result, the division circuit also carries out the correct division operation for the dividend x and the divisor A.

When a divisor A in the third range [1/16>A] is applied to the divisor input terminal 13, the first and second divisor value range discriminators 45 and 46 of the divisor value range discrimination circuit 36 apply the logic values "1" and "0" to the second selector 44, respectively. As a result, the second selector 44 selects its fourth selector terminal Sb4. A modified divisor 16·A amplified by the 16-times gain amplifier 43 is applied to the complement generator 30. That is, the divisor A in the very small value range [1/16>A] is modified to the amplified divisor 16·A which is close to the value "1". The amplified divisor 16·A is applied to the complement generator 30.

On the other hand, the logic values "1" and "0" of the first and second divisor value range discriminators 45 and 46 of the divisor value range discrimination circuit 36 control the first selector 40 to select the fourth selector terminal Sa4. Thus, a modified dividend amplified by the 16-times gain amplifier 39 is applied to the adder 28. That is, the dividend x is amplified to the value 16·x for compensating similarly the modification of the divisor A. As a result, the division circuit also carries out the correct division operation for the dividend x and the divisor A.

Thus, the second embodiment of the division circuit according to the present invention modifies the divisor A to the suitable value close to the value "1". So that, the quotient y obtained by the cyclic division operations in the operation loop 33 collects to the corresponding true value to be obtained within a relatively small number of circulations. That is, the quotient y collects to the true value at a relatively small time of period.

As described above, the present invention can provide an extremely preferable division circuit.

While there has been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A division circuit for calculating a division between a dividend and a divisor comprising:
    a first input means for receiving the dividend;
    a second input means for receiving the divisor;
    an adder means connected at its first input terminal to a first input means for receiving the dividend and having a second input terminal;
    a multiplier means connected at its first input terminal to the output terminal of the adder means and at its output terminal to the second input terminal of the adder means so that the adder means and the multiplier means constitute an operation loop, said multiplier means having a second input terminal;

a complement generator connected between said second input means and the second input of said multiplier means for generating a complement of the divisor equal to one minus the divisor; and a registor means coupled to the output of said adder means for outputting a quotient obtained in the operation loop.

2. The division circuit of claim 1 further comprising a delay means coupled between the output terminal of the adder means and the first input terminal of the multiplier means.

3. The division circuit of claim 2 further comprising a first amplifier means coupled between the second input means and the multiplier means for amplifying the divisor and a second amplifier means coupled between the first input means and the adder means for amplifying the dividend by the same amount as the amplifier means.

4. The division circuit of claim 3 wherein the first amplifier means include a first plurality of amplifiers with different amplifications and the second amplifier means include a second plurality of amplifiers with different amplifications.

5. The division circuit of claim 4 further comprising a divisor value discriminating means for selectively actuating one of the first plurality of amplifiers and one of the second plurality of amplifiers in response to the divisor value.

6. The division circuit of claim 5 wherein the divisor value discriminating means discriminate a plurality of divided ranges of the divisor.

* * * * *